(12) United States Patent
Prasad et al.

(10) Patent No.: US 6,377,618 B1
(45) Date of Patent: Apr. 23, 2002

(54) AUTO-CORRELATION SYSTEM AND METHOD FOR RATE DETECTION OF A DATA COMMUNICATION CHANNEL

(75) Inventors: Mohit K. Prasad, San Diego, CA (US); Mark E. Warner, Pottstown, PA (US)

(73) Assignee: Agere Systems Guardian Corp., Miami Lakes, FL (US)

(*) Notice: Subject to any disclaimer, the term of this patent is extended or adjusted under 35 U.S.C. 154(b) by 0 days.

(21) Appl. No.: 09/223,543

(22) Filed: Dec. 30, 1998

(51) Int. Cl.[7] .......................... H04B 3/46; H04B 17/00; H04Q 1/20
(52) U.S. Cl. ...................... 375/225; 375/150; 375/343; 375/142
(58) Field of Search ................................ 375/225, 224, 375/343, 150, 142; 370/233, 234, 253; 708/422, 426

(56) References Cited

U.S. PATENT DOCUMENTS 6,178,025 B1 * 1/2001 Hardcastle et al. ......... 359/177
6,266,172 B1 * 7/2001 Zirngibl ...................... 359/189
6,285,722 B1 * 9/2001 Banwell et al. ............. 375/354

* cited by examiner

Primary Examiner—Mohammad H. Ghayour
(74) Attorney, Agent, or Firm—Steve Mendelsohn; Ian M. Hughes

(57) ABSTRACT

Rate detection of a data rate within a sequence of transmitted symbols employs correlation to calculate estimates of the auto-correlation values, or estimated coefficients, of the sequence. When the sequence of transmitted symbols includes repeated symbol values, the auto-correlation values indicate a degree of self-similarity within the sequence. A decision statistic may be formed from the auto-correlation values. The self-similarity of the auto-correlation values may be employed as a decision statistic with associated hypothesis test pair values. Various decision methods may be implemented to compare auto-correlation values to thresholds based on the hypothesis test pair values. Based on the comparison, the data rate of the sequence may be determined. Once the information is determined related to the data rate, the information may be employed by a Viterbi detector to adjust the decoding rate for decoding the symbols.

17 Claims, 4 Drawing Sheets

AUTO-CORRELATION SYSTEM AND METHOD FOR RATE DETECTION OF A DATA COMMUNICATION CHANNEL

BACKGROUND OF THE INVENTION

1. Field of the Invention

The present invention relates to processing of data channels in a telecommunications system, and, more particularly, to detection of the data rate of the channel for subsequent decoding.

2. Description of the Related Art

Many telecommunications applications transmit data through a communication channel with varying data rates. For example, the IS-95 digital cellular and J-STD-008 personal communication system (PCS) standards employ speech coders with variable data rates that vary from frame-to-frame, depending on the speech activity. For these applications, the standard speech frame is of 20-ms duration, the frame having 160 13-bit sample values. The sample values (at 8 KHz) are encoded using 171, 80, 40, or 16 bits. After padding, adding frame quality indicators for some of the data rates, and adding tail bits, the 20-ms speech frame data are encoded into 192, 96, 48, and 24 bits, respectively. The final coding yields the standard data rates of 9600, 4800, 2400, and 1200-bps.

The speech coder may be followed by a rate ½, 256-state convolutional coder that provides the data at traffic rates of 19.2, 9.6, 4.8, and 2.4 kbps through the channel. Each frame comprises 384, 192, 96, and 48 symbols, respectively, but the traffic channel is transmitted through the communication channel at a constant rate of 19.2 kbps by repeating the symbols at 9.6, 4.8, and 2.4 kbps twice, four times, and eight times respectively. Symbol repetition may further be followed by an interleaving step for limited burst error protection. Power control information may also be added to the interleaved bits by inserting or overwriting specific information bits. This power control information may require replacement of 32 symbols in each frame with the power control bits.

Information related to the data rate of the speech coder may not necessarily be transmitted explicitly through the communication channel. The receiver may or may not have the ability to determine, a-priori, the rate at which data have been transmitted. For an IS-95 receiver of the prior art, all data are processed at 19.2 kbps. The Viterbi decoder then decodes the data at each of the four different rates, and the decoding rate with the minimum decoding error during Viterbi detection is chosen for further processing. Viterbi decoding is a relatively intense computational operation.

SUMMARY OF THE INVENTION

The present invention relates to determining a data rate of a received sequence of N symbols, N being an integer greater than 0. For applications including, for example, Viterbi decoding in a receiver, detecting the rate of the data in accordance with the present invention before Viterbi decoding may allow for Viterbi decoding only once, since only one computation is performed corresponding to the detected rate. For an exemplary embodiment of the present invention, a set of auto-correlation values are calculated for the received sequence, each auto-correlation value corresponding to a different cyclic shift of the received sequence. Comparing each auto-correlation value with at least one threshold value generates one or more comparison values, and each threshold value corresponds to a different data rate.

The data rate of the sequence is determined from the one or more comparison values. Further embodiments of the present invention may detect the data rate based either on the sign-bit and magnitude values of the symbols or only on the single sign-bit value, respectively.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
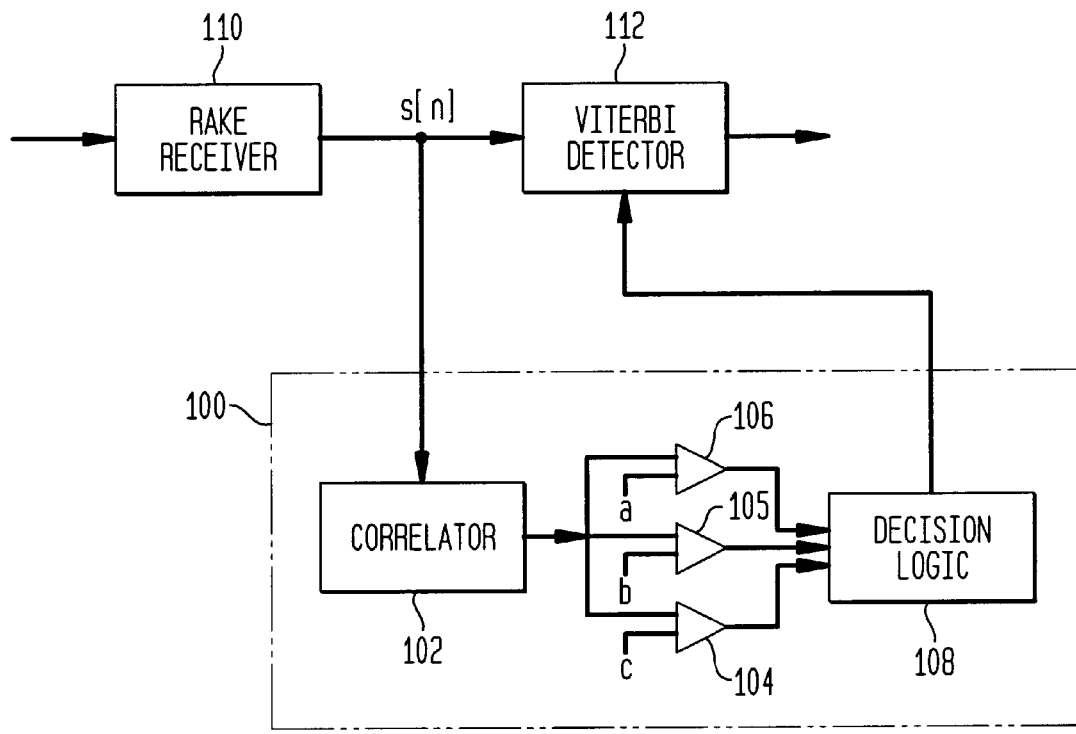
FIG. 1 shows a block diagram of an exemplary embodiment of a rate detection system in accordance with the present invention.

Referring to FIG. 1, there is shown an exemplary embodiment of a rate detection system 100 in accordance with the present invention. Rate detection system 100 includes correlator 102, threshold detectors 104, 105, and 106, and decision logic 108. Correlator 102 calculates a set of auto-correlation values for each cyclic shifts of an input sequence. Threshold detectors 104, 105, and 106 each compare calculated auto-correlation values of correlator 102 with hypothesis test values associated with the various digital data rates to be detected. Decision logic 108 determines the digital data rate present in the input sequence based on the comparisons of threshold detectors 104, 105, and 106.

While three threshold detectors 104, 105, and 106 are shown corresponding to an exemplary embodiment detecting data rates of 9600, 4800, 2400, and 1200-bps, the present invention is not so limited. For example, if there are N digital data rates to be detected, N−1 threshold detectors may be employed, since the full rate case may be defined as the default detected rate unless a subsequent test of the rate detection system 100 detects a lower rate. In the alternative, only one comparator may be employed, with the comparison value changed for each detection step after the auto-correlation value is calculated. For the preferred embodiments described below, rate detection system 100 may be included in a wireless handset receiver, such as may be as employed in a telecommunications system conforming to an IS-95 standard. However, the present invention is not so limited and may be employed in any system to determine a data rate in repeated data.

For the exemplary IS-95 application, the rate detection system 100 may also receive the sampled data from a RAKE receiver 110. The digitally sampled data from a RAKE receiver 110 corresponds to received symbols representing digital data of 9600, 4800, 2400 or 1200-bps. Although FIG. 1 shows that the RAKE receiver 110 provides the sampled data to Viterbi detector 112, it would be apparent to one skilled in the art that several other types of processing may occur before Viterbi decoding. For example, bit interleaving may be employed in the transmitter to randomize the data transmitted through the channel. A de-interleaver may then be employed after the RAKE receiver 110 to de-interleave the bits, thereby spreading burst errors over a frame of digital data.

Viterbi detector 112 receives the sampled data representing received symbols and decodes the symbols into decoded digital data. For the exemplary application of a receiver of an IS-95 transceiver, the Viterbi detector 112 receives a frame of digitally sampled data representing a predetermined number of encoded symbols, such as 384 symbols. As described previously, symbols for digital data at a data rate less than 9600-bps may be repeated two (4800), four (2400), or eight (1200) times within a frame.

Rate detection system 100, as described herein with respect to the preferred embodiments, monitors the digitally sampled data to determine the data rate of the digital data in the frame. The digitally sampled data may consist of sign and magnitude bit values, The output signal of decision logic 108 corresponds to the rate of digital data represented by the symbols provided to the Viterbi detector 112 and may be employed to adjust the decoding process of the Viterbi detector 112.

The correlator 102 receives the digitally sampled data into two registers as similar sequences A and B. The correlator 102 performs an auto-correlation calculation with the sequences A and B for cyclic shifts of one sequence with respect to the other sequence by a period of one symbol. For one exemplary embodiment, for each auto-correlation calculation with each data sample having sign and magnitude bit values, the corresponding data samples of the two sequences are multiplied together and accumulated to form an auto-correlation value. For another exemplary embodiment, for each auto-correlation calculation, only the signbits of the corresponding data samples of the two sequences are multiplied together and accumulated to form an auto-correlation value.

Figure 2:
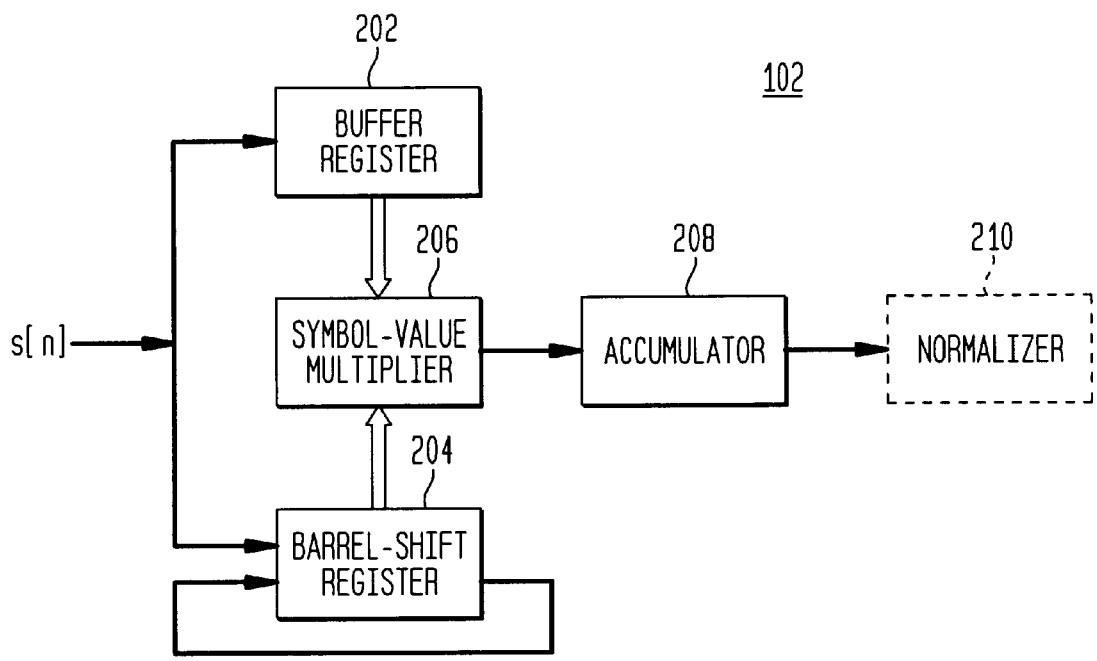
FIG. 2 shows a block diagram of the correlator of the rate detection system of FIG. 1.

FIG. 2 is a block diagram showing an exemplary correlator 102 as may be employed with the present invention. As shown in FIG. 2, correlator 102 comprises a buffer register 202, barrel-shift register 204, symbol value multiplier 206, and accumulator 208. An optional normalization circuit 210 may also be provided. While barrel-shift register 204 is shown in FIG. 2, any form of storage providing a cyclic memory function may be employed, such as a memory with cyclic addressing, feedback register, or the like.

Buffer register 202 and barrel-shift register 204 each receive the frame of N symbols represented by the received sequence of digitally sampled data. Symbol value multiplier 206 multiplies corresponding symbol values of the buffer register 202 and barrel-shift register 204 to form corresponding correlation values. The correlation values are provided to the accumulator 208 that adds the correlation values together to yield the auto-correlation value. Accumulator 208 may then provide the auto-correlation value to normalizer 210 to perform normalization of the auto-correlation value over the number of symbols in the sequence.

Once the auto-correlation value is formed, the sequence of the barrel-shift register is cyclic-shifted by one symbol period. Then the next auto-correlation value is calculated. The process is repeated for all N cyclic shifts of the sequence in the barrel-shift register 204.

The exemplary embodiment employing both the sign and magnitude bit values for auto-correlation calculation allows for more accurate determination of mean auto-correlation values for the sequence, since the relative magnitude of the sample data compensates for sample value errors. The other exemplary embodiment employing only a sign bit for auto-correlation calculation allows for less complex implementation. The buffers storing the sequences require only a single bit per sample, reducing memory requirements. Further, the multiplication of signbits may be performed with exclusive-or (XOR) gates, multiplexers, or similar circuitry, which are implemented in hardware relatively easily with a small amount of integrated circuit (IC) real estate when compared to multi-bit multipliers.

Threshold detectors 104, 105, and 106 each compare the calculated auto-correlation value of one of the cyclic shifts with a hypothesis test value, or point, related to a predetermined mean auto-correlation value. Predetermined cyclic shifts of one sequence with respect to the other sequence may provide non-zero (normalized) mean auto-correlation values based on whether digital data is repeated in the received sampled data. The non-zero (normalized) mean auto-correlation values are determined based on the varying repetition rates of the digital data. A method of calculating the predetermined mean auto-correlation values and generating the hypothesis test points is described subsequently.

Figure 3A:
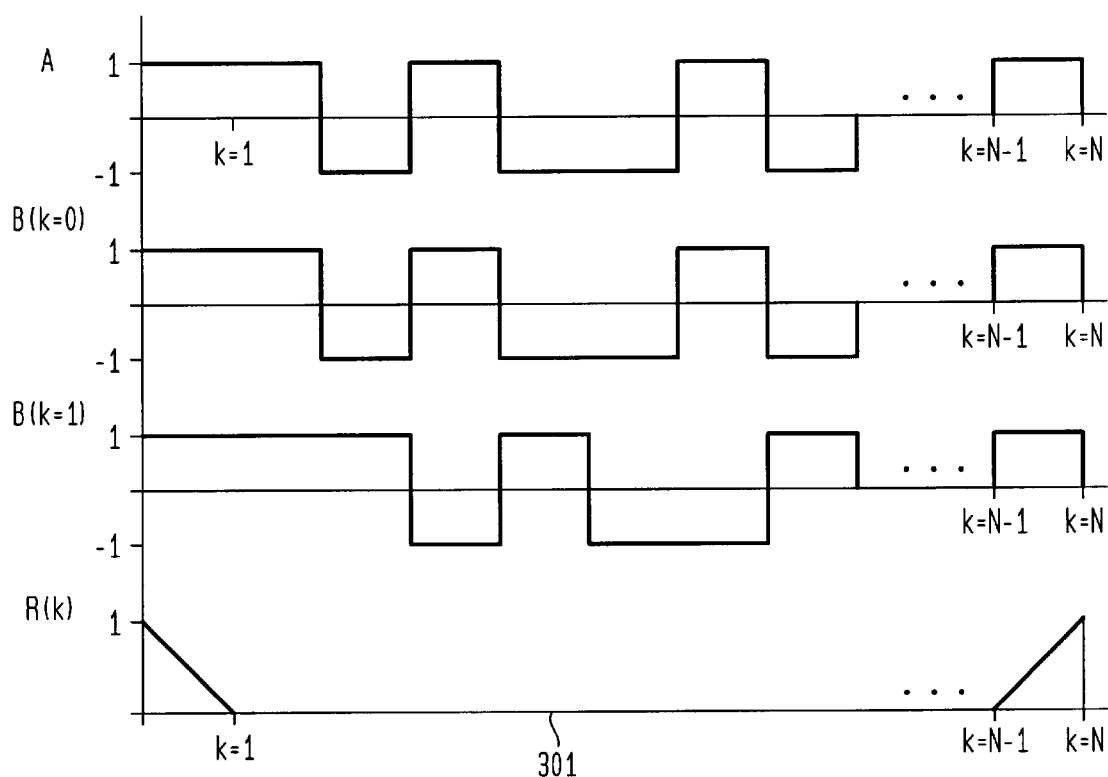
FIG. 3A illustrates self-similarity by calculation of auto-correlation values for 9600-bps data.
Figure 3B:
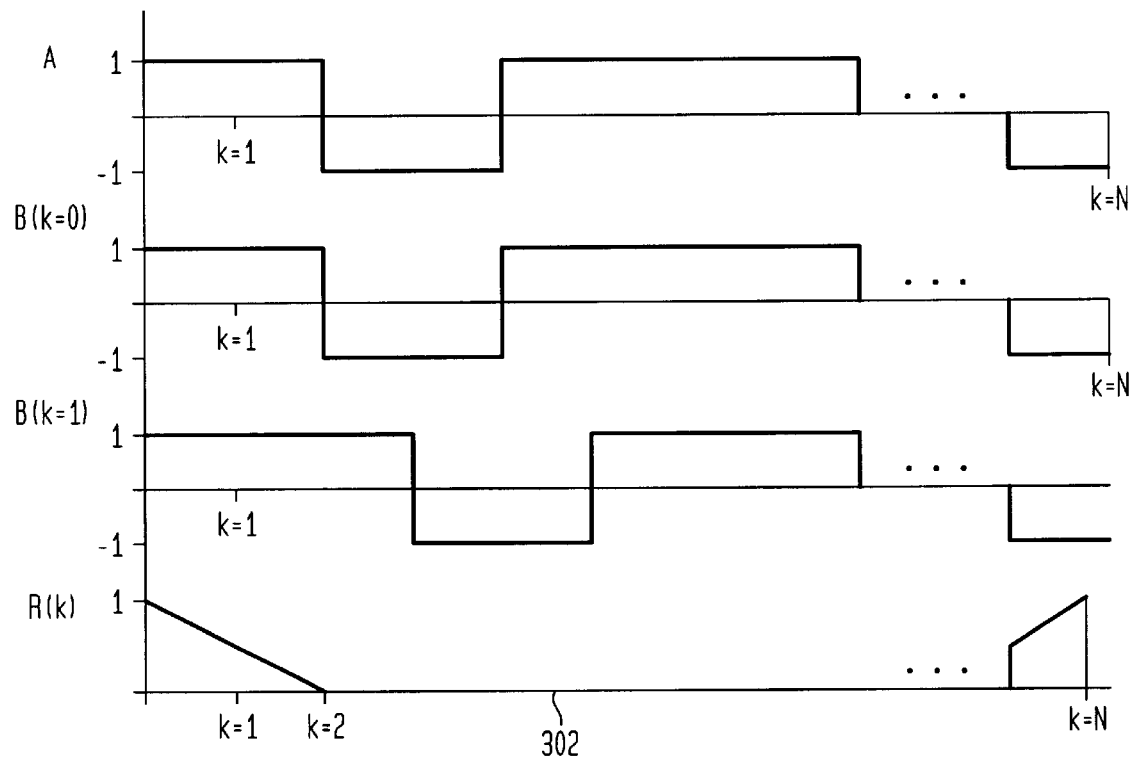
FIG. 3B illustrates self-similarity by calculation of auto-correlation values for 4800-bps data.

FIGS. 3A and 3B illustrate the calculation of non-zero mean auto-correlation values for data rates of 9600 and 4800-bps with different cyclic shifts k of symbol period $\tau$ ($\tau$ in sec, k being an integer and $0 \leq k \leq N-1$) of the sequence d(n) of N symbols. For the example of FIGS. 3A and 3B, the symbol values for the digital data are assumed to have random distribution. As shown in FIG. 3A, when the digital data is at 9600-bps, no repetition occurs. The auto-correlation calculation 301 provides a relatively large mean value R(k=0) for no cyclic shift (k=0) between sequences A and B. For all other cyclic shifts of the sequence (i.e., for offset N>k>0), the auto-correlation mean value is zero (as long as the sample data values are randomly distributed). However, as shown in FIG. 3B, when the digital data is at 4800-bps, repetition of the values occurs. Consequently, the auto-correlation calculation 302 provides a relatively large mean value R(k=0) at (k–0) and a relatively small non-zero mean value at one offset (k=1), as long as the sample data values are randomly distributed.

Returning to FIG. 1, threshold detectors 104, 105, and 106 each compare the calculated auto-correlation value of one cyclic shift with a hypothesis test point corresponding to the shift. The threshold detectors 104, 105, and 106 each provide a bit value indicating the presence or absence of the corresponding predetermined mean auto-correlation value for the shift in the sequence. Decision logic 108 receives the output values of the threshold detectors 104, 105, and 106 and provides a two-bit value corresponding to the lowest digital data rate detected. Alternatively, the functionality of the threshold detectors 104, 105, and 106 and decision logic 108 may be implemented with an application specific processor, such as a digital signal processor (DSP).

For the present invention, a decision statistic is formed from calculated auto-correlation values, or coefficients. As described subsequently, comparing single coefficients of the auto-correlation function (the auto-correlation values for each shift) allows for relatively accurate rate detection. However, as would be apparent to one skilled in the art, other decision statistics may be formed. For example, the sum of calculated auto-correlation coefficients may be employed as the decision statistic. In addition, computing auto-correlation coefficients may include dot product computational methods, which are particularly suited for implementation with digital signal processors.

The method for rate detection is described for rate-detection as a simplified case. The data is sampled after, for example, the RAKE receiver, and is discrete-time valued but not of discrete amplitude. Further, no power control information is included.

As is known in the art, auto-correlation is defined as a mathematical method of measuring self-similarity or order within a signal or discrete sequence. Rate detection may employ an auto-correlation method to detect self-similarity within the data to decide if the data has values that repeat or are random. For IS-95 systems, for example, four different types of repetition occur. In the full rate case, data is random. The other cases have data repeated twice, four times, and eight times, respectively. The four cases correspond to a frame of sampled data where the same sample occurs once, twice, four, and eight times, respectively.

By computing the auto-correlation values for these different type frames, the self-similarity of the frames may be quantified. The auto-correlation values are calculated for specific cyclic shifts of the sequence corresponding to the positions of the repeated data in each of the different type frames. The cyclic shifts with non-zero auto-correlation values corresponding to interleaved repetition, for example, are different from the cyclic shifts with non-zero auto-correlation values corresponding to sequential repetition. As would be apparent to one skilled in the art, a rate detection system may be designed either having a-priori information of the repetition method, or may perform rate detection separately for all different repetition methods.

The received signal may be a random stochastic process, denoted as s(n), n=(−∞, . . . , 0,1, . . . , ∞), and may be defined as in equation (1):

$$s(n)=d(n)+v(n). \tag{1}$$

where d(n) are the data symbols and v(n) represents a zero-mean, white Gaussian noise. When the data rate is 9600-bps, none of the symbols in the frame repeat and the received signal may be as defined in equation (2):

$$s(n) = \sum_j b(n)\delta(n-j) + v(n) \tag{2}$$

where b(n) is a symmetric binomial variate representing the data bits and δ(n) is the delta function.

For the ideal case, the data frame is considered to be of infinite length, to permit exact computation of the auto-correlation coefficients for this case. When the data rate is 4800-bps, each symbol is repeated twice, and the received signal may be as defined in equation (3):

$$s(n) = \sum_j b(n)[\delta(n-2j) + \delta(n-2j-1)] + v(n). \tag{3}$$

When the data rate is 2400-bps, each symbol is repeated four times, and the received signal may be defined as in equation (4):

$$s(n) = \sum_j b(n)[\delta(n-4j) + \delta(n-4j-1) + \ldots + \delta(n-4j-3)] + v(n). \tag{4}$$

When the data rate is at 1200-bps, each symbol is repeated eight times, and the received signal may be defined as in equation (5):

$$s(n) = \sum_j b(n)[\delta(n-8j) + \delta(n-8j-1) + \ldots + \delta(n-8j-7)] + v(n). \tag{5}$$

The auto-correlation coefficient R(k), where k is a shift of the sequence by k symbol periods, is defined as in equation (6):

$$R(k) = \sum_n s(n)s(n+k). \tag{6}$$

The auto-correlation coefficient R(k) may be equivalent to the auto-correlation value calculated for a specific cyclic shift k of the input sequence.

As would be apparent to one skilled in the art, equation (2) through equation (5) may each include a factor to ensure that the total energy per bit for the sequences are equivalent when bits are repeated. Consequently, equation (2) through equation (5) may each include a multiplication by a constant related to the energy per bit eb (e.g., $\sqrt{eb}$ for equation (2), $\sqrt{eb}/\sqrt{2}$ for equation (3), $\sqrt{eb}/2$ for equation (4), and $\sqrt{eb}/2\sqrt{2}$ for equation (3)). Such factor may be removed by normalization of the quantities calculated, and so, for the following, the difference in energy is compensated for with normalized auto-correlation coefficients.

Employing equation (2) through equation (5) in equation (6), the auto-correlation coefficients, R(k) for each of the above data rates may be computed.

For the data rate of 9600-bps, the auto-correlation coefficients are shown in equation (7):

$$R(k) = \begin{cases} \sigma_b^2 + \sigma_v^2, & k = 0 \\ 0, & \text{otherwise} \end{cases} \tag{7}$$

where $\sigma_b$ is the auto-correlation mean value of b(n) and $\sigma_v$ is the mean value of the noise v(n). For a data rate of 4800-bps, the auto-correlation coefficients are shown in equation (8):

$$R(k) = \begin{cases} 2\sigma_b^2 + \sigma_v^2, & k = 0 \\ \sigma_b^2, & k = \pm 1 \\ 0, & \text{otherwise} \end{cases} \tag{8}$$

For a data rate of 2400-bps, the auto-correlation coefficients are as shown in equation (9):

$$R(k) = \begin{cases} 4\sigma_b^2 + \sigma_v^2, & k = 0 \\ 3\sigma_b^2, & k = \pm 1 \\ 2\sigma_b^2, & k = \pm 2 \\ \sigma_b^2, & k = \pm 3 \\ 0, & \text{otherwise} \end{cases} \tag{9}$$

For a data rate of 1200-bps, the auto-correlation coefficients are as shown in equation (10):

$$R(k) = \begin{cases} 8\sigma_b^2 + \sigma_v^2, & k = 0 \\ 7\sigma_b^2, & k = \pm 1 \\ 6\sigma_b^2, & k = \pm 2 \\ 5\sigma_b^2, & k = \pm 3 \\ 4\sigma_b^2, & k = \pm 4 \\ 3\sigma_b^2, & k = \pm 5 \\ 2\sigma_b^2, & k = \pm 6 \\ \sigma_b^2, & k = \pm 7 \\ 0, & \text{otherwise} \end{cases} \tag{10}$$

The computation of auto-correlation coefficients for the ideal case provides a first-order approximation of the values of the auto-correlation coefficients for the non-ideal case. For the non-ideal case, equation (1) through equation (10) are modified to limit the number of symbols for correlation to the number of symbols, N, in a frame. The data rates may be determined for the non-ideal case similarly by comparing auto-correlation coefficients for predetermined cyclic shifts of the sequence.

The following describes the processing for a finite-length frame for the non-ideal case. For an IS-95 application, for example, the auto-correlation computation may be performed for each frame separately. For the following exemplary embodiment, each frame comprises 384 symbols. As would be apparent to one skilled in the art, the present invention is not so limited to this frame size.

When the data rate is 9600-bps, the received signal may be as defined in equation (11):

$$s(n) = \sum_{j=0}^{383} b(n)\delta(n-j) + v(n) \tag{11}$$

where b(n), δ(n), and v(n) are as previously defined. When the data rate is 4800-bps, the received signal may be defined as in equation (12):

$$s(n) = \sum_{j=0}^{191} b(n)[\delta(n-2j) + \delta(n-2j-1)] + v(n). \tag{12}$$

When the data rate is 2400-bps, the received signal may be defined as in equation (13):

$$s(n) = \sum_{j=0}^{95} b(n)[\delta(n-4j) + \delta(n-4j-1) + \ldots + \delta(n-4j-3)] + v(n). \tag{13}$$

When the data rate is 1200-bps, the received signal may be defined as in equation (14):

$$s(n) = \sum_{j=0}^{47} b(n)[\delta(n-8j) + \delta(n-8j-1) + \ldots + \delta(n-8j-7)] + v(n). \tag{14}$$

The estimate of the auto-correlation coefficient, $\hat{R}(k)$, may be calculated as given by equation (15), is estimate of the auto-correlation may be biased.

$$\hat{R}(k) = \frac{1}{N} \sum_{n=0}^{N-k-1} s(n)s(n+k). \tag{15}$$

For equation (15), k is as defined before, with $0<k<N-1$, and so the integer value k is a positive integer. If negative shifts of the sequences are employed, k may have a negative value. For this case, the summation over n in equation 15 employs the absolute value of k. The estimate as given in equation (15) may be, however, relatively easy to compute even though the calculation may include a relatively small mean square error. As would be apparent to one skilled in the art, other methods to compute the estimate may be employed. The variance of the estimate $\hat{R}(k)$ of equation (15) may be calculated by employing statistical methods as known in the art, and may be defined as in equation (16):

$$\mathrm{var}(\hat{R}(k)) \cong \frac{1}{N} \sum_{m=-\infty}^{\infty} [\hat{R}^2(m) + \hat{R}(m+k)\hat{R}(m-k)]. \tag{16}$$

Table 1 lists the mean and variances of the normalized auto-correlation coefficients calculated in accordance with equations (15) and (16) for N=384 and for each of the four different rates of an exemplary embodiment. For Table 1, the SNR of the input is 3 dB, such that $\sigma_b^2 = 2\sigma_v^2$, and the input sample sequence represents full-scale input data (i.e., b(n)= ±1, $\sigma_b^2 = 1$, and $\sigma_v^2 = 0.5$).

TABLE 1

| k | mean ($\hat{R}$ (k)) 9600 | var ($\hat{R}$ (k)) 9600 | mean ($\hat{R}$ (k)) 4800 | var ($\hat{R}$ (k)) 4800 | mean ($\hat{R}$ (k)) 2400 | var ($\hat{R}$ (k)) 2400 | mean ($\hat{R}$ (k)) 1200 | var ($\hat{R}$ (k)) 1200 |
|---|---|---|---|---|---|---|---|---|
| 0 | 1.0 | 0.008 | 1.0 | 0.017 | 1.0 | 0.056 | 1.0 | 0.216 |
| 1 | 0 | 0.004 | 0.4 | 0.010 | 0.67 | 0.047 | 0.82 | 0.206 |
| 2 | 0 | 0.004 | 0 | 0.009 | 0.44 | 0.034 | 0.71 | 0.184 |
| 3 | 0 | 0.004 | 0 | 0.009 | 0.22 | 0.029 | 0.59 | 0.158 |
| 4 | 0 | 0.004 | 0 | 0.009 | 0 | 0.028 | 0.47 | 0.134 |
| 5 | 0 | 0.004 | 0 | 0.009 | 0 | 0.028 | 0.35 | 0.119 |
| 6 | 0 | 0.004 | 0 | 0.009 | 0 | 0.028 | 0.24 | 0.111 |
| 7 | 0 | 0.004 | 0 | 0.009 | 0 | 0.028 | 0.12 | 0.108 |
| >7 | 0 | 0.004 | 0 | 0.009 | 0 | 0.028 | 0 | 0.108 |

Figure 4:
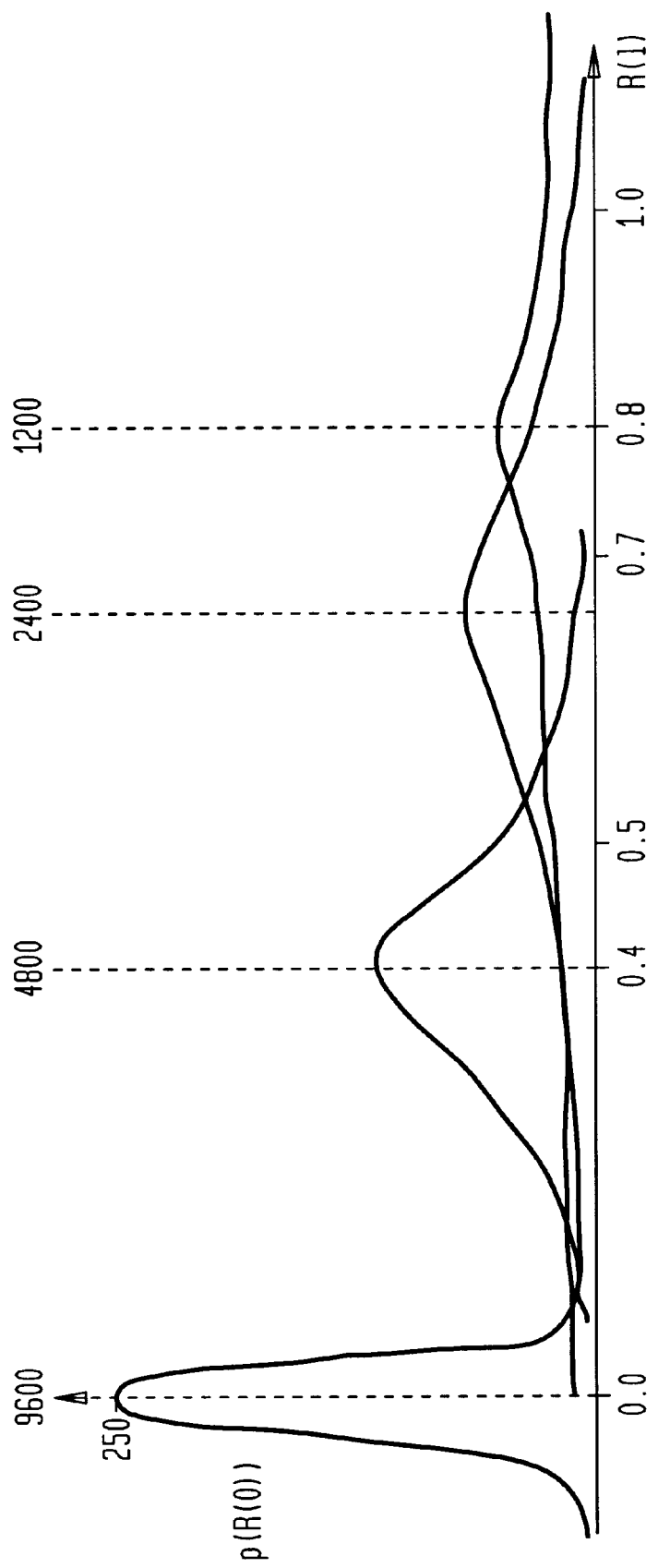
FIG. 4 illustrates distributions for mean and variance values of estimates of the auto-correlation values for exemplary rates of the rate detection system of FIG. 1.

Each estimate $\hat{R}(k)$ of the auto-correlation coefficient is a random variable, with Gaussian distribution having a mean and variance as given in Table 1. FIG. 4 illustrates distributions of $\hat{R}(1)$ for each of the four different rates for values of the exemplary embodiment given in Table 1.

Given the estimate of auto-correlation coefficients, a rate detection algorithm may perform a set of binary hypothesis tests. Let $H_{9600}^0$ denote the hypothesis that the detected data rate based on the value of $\hat{R}(0)$ is 9600-bps. In the same manner, $H_{4800}^0$ is true if, based on the value of $\hat{R}(0)$, the data rate is 4800-bps, and the hypotheses $H_{2400}^0$ and $H_{1200}^0$ are each true if, based on the value of $\hat{R}(0)$, the data rates are 2400 and 1200, respectively. The normalized, Gaussian distributions (N($\mu$, σ)) of $\hat{R}(0)$ for 9600, 4800, 2400, and 1200 may be calculated and have mean $\mu$ and variance σ. The distributions N($\mu$, σ) of $\hat{R}(0)$ are given by N(1.5,0.01), N(2.5,0.04), N(4.5,0.25), and N(8.5,1.83), respectively, for the exemplary values of Table 1.

For the exemplary embodiment, two of the hypothesis may be tested at a time, for a total of 6 binary hypothesis test decisions. Defining the probability of false detection as relatively equal for each pair of hypothesis tested, six threshold values may be computed as hypothesis test values, or points. To compute the threshold value for any pair, the maximum likelihood binary decision rule may be employed, although other techniques are also possible.

For any two hypotheses described by corresponding Gaussian distributions, $N_i(\mu_i, \sigma_i)$, $i=0,1$, the log-likelihood ratio, $l(z)$, for the hypothesis test value z to be equally likely may be defined as in equation (17):

$$l(z) = \ln\left(\frac{\sigma_1}{\sigma_0}\right) - \frac{1}{2}\left[\left(\frac{z-\mu_0}{\sigma_0}\right)^2 - \left(\frac{z-\mu_1}{\sigma_1}\right)^2\right] = 0 \quad (17)$$

$$P_E = \frac{1}{2}\left[Q\left(\frac{T-\mu_0}{\sigma_0}\right) + Q\left(\frac{T-\mu_1}{\sigma_1}\right)\right] \quad (20)$$

In equation (20), "Q", as is well known in the art, represents the mathematical Q-function. Each of the rates may be assumed to be equally likely. However, one skilled in the art would recognize that the analysis may be modified for shared rate probability. Note that for such modification the threshold value T may also be modified, requiring a correction factor.

The probability of false detection for each pair of hypothesis tests may be computed for each of the auto-correlation coefficients, and the results for the exemplary embodiment for Tables 1 and 2 are as listed in Table 3:

TABLE 3

| Hypothesis pair | k = 1 | k = 2 | k = 3 | k = 4 | k = 5 | k = 6 | k = 7 | $P_E$ all k | $P_E$ majority |
|---|---|---|---|---|---|---|---|---|---|
| $H_{9600}{}^k$ and $H_{4800}{}^k$ | 0.007 | 1.0 | 1.0 | 1.0 | 1.0 | 1.0 | 1.0 | 7.0E-3 | 7.0E-3 |
| $H_{9600}{}^k$ and $H_{2400}{}^k$ | 0.007 | 0.033 | 0.148 | n.a. | n.a. | n.a. | n.a. | 3.5E-5 | 6.2E-3 |
| $H_{9600}{}^k$ and $H_{1200}{}^k$ | 0.040 | 0.052 | 0.071 | 0.099 | 0.140 | 0.193 | 0.263 | 1.0E-7 | 4.2E-3 |
| $H_{4800}{}^k$ and $H_{2400}{}^k$ | 0.177 | 0.054 | 0.191 | n.a. | n.a. | n.a. | n.a. | 1.8E-3 | 3.5E-2 |
| $H_{4800}{}^k$ and $H_{1200}{}^k$ | 0.166 | 0.067 | 0.090 | 0.121 | 0.168 | 0.226 | 0.511 | 2.4E-6 | 2.1E-2 |
| $H_{2400}{}^k$ and $H_{1200}{}^k$ | 0.503 | 0.285 | 0.226 | 0.170 | 0.223 | 0.084 | 0.511 | 5.3E-5 | 9.4E-2 |

Solving the quadratic of equation (17) for z yields equation (18):

$$z = \frac{\left(\frac{\mu_0}{\sigma_0} - \frac{\mu_1}{\sigma_1}\right) \pm \sqrt{\left(\frac{\mu_0}{\sigma_0} - \frac{\mu_1}{\sigma_1}\right)^2 - \left(\frac{1}{\sigma_0^2} - \frac{1}{\sigma_1^2}\right)\left(\frac{\mu_0^2}{\sigma_0^2} - \frac{\mu_1^2}{\sigma_1^2} + \ln\frac{\sigma_0^2}{\sigma_1^2}\right)}}{\frac{1}{\sigma_0^2} - \frac{1}{\sigma_1^2}} \quad (18)$$

Table 2 lists the threshold values for the six different pairs of hypotheses with the mean and variance values as given in Table 1. For Table 2, the maximum likelihood threshold values for hypothesis test pairs are calculated in accordance with equation (18) and are given for a full-scale input case. The SNR is 3 dB, and auto-correlation coefficients with corresponding thresholds are normalized with respect to the mean square value energy. ("n.a." in Table 2 is "not applicable.")

The overall probability of error may be reduced by an exhaustive comparison for each threshold and combining the result either by majority counting or by other algorithms known in the art. The second-to-last column of Table 3 lists the probability of error ($P_E$) for each pair of rate determination hypothesis tests. The last column of Table 3 lists the error probability under a majority decision rule.

Figure 5:
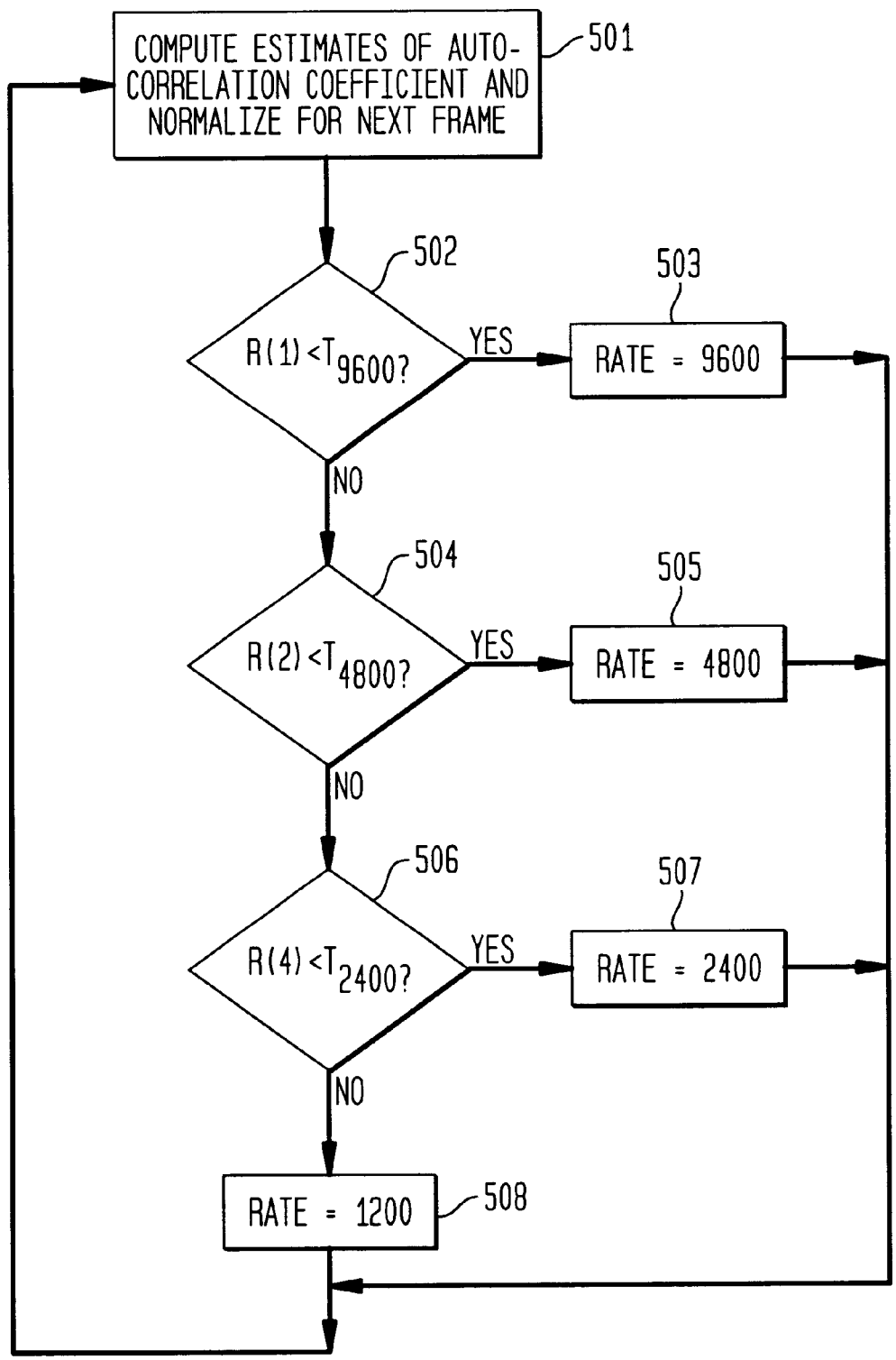
FIG. 5 shows a flow chart of an exemplary rate detection algorithm as may be employed by the decision logic of the rate detection system of FIG. 1.

FIG. 5 shows the flowchart for the rate detection algorithm for an exemplary embodiment having a performance similar to the exhaustive-compare method outlined above to reduce overall probability of error. FIG. 5 is described below as implemented with the correlator 102, comparators 104–106, and decision logic 108 of FIG. 1. As shown in FIG. 5, at step 501, the estimates of the auto-correlation coefficients for a frame are calculated first, which may be the auto-correlation values provided by the correlator 102.

Next, the auto-correlation coefficients are compared with the predetermined threshold values from the hypothesis test

TABLE 2

| Hypothesis pair | $\hat{R}$ (k = 1) | $\hat{R}$ (k = 2) | $\hat{R}$ (k = 3) | $\hat{R}$ (k = 4) | $\hat{R}$ (k = 5) | $\hat{R}$ (k = 6) | $\hat{R}$ (k = 7) |
|---|---|---|---|---|---|---|---|
| $H_{9600}{}^k$ and $H_{4800}{}^k$ | 0.16 | n.a. | n.a. | n.a. | n.a. | n.a. | n.a. |
| $H_{9600}{}^k$ and $H_{2400}{}^k$ | 0.18 | 0.14 | 0.10 | n.a. | n.a. | n.a. | n.a. |
| $H_{9600}{}^k$ and $H_{1200}{}^k$ | 0.16 | 0.15 | 0.14 | 0.13 | 0.12 | 0.12 | 0.11 |
| $H_{4800}{}^k$ and $H_{2400}{}^k$ | 0.54 | 0.17 | 0.12 | n.a. | n.a. | n.a. | n.a. |
| $H_{4800}{}^k$ and $H_{1200}{}^k$ | 0.58 | 0.20 | 0.19 | 0.17 | 0.16 | 0.15 | 0.15 |
| $H_{2400}{}^k$ and $H_{1200}{}^k$ | 0.93 | 0.68 | 0.45 | 0.24 | 0.21 | 0.20 | 0.20 |

The probability of false detection may be computed as known in the art for each pair of hypothesis tests. The probability of false detection, $P_E$, for the generalized case is as given in equation (19):

$$P_E = P(H_{R0}{}^k|H_{R1}{}^k)\,P(H_{R1}{}^k) + P(H_{R1}{}^k|H_{R0}{}^k)P(H_{R0}{}^k) \quad (19)$$

In equation (19), $H_{Ri}{}^k$ denotes examination of the $k^{th}$ auto-correlation value for estimate $\hat{R}_i(k)$. The two rates under consideration here are $\hat{R}_0$ and $\hat{R}_1$. If the threshold T between the hypotheses $\mu_i(i=0,1)$ is $\mu_0<T<\mu_1$, then the probability of error $P_E$ may be defined as in equation (20).

analysis described previously. The comparisons shown in FIG. 5 may be for the mean and variance values for estimates as calculated and shown in Tables 1 and 2, with the threshold values $T_{(RATE)}$ selected from the Hypothesis test pairs of Table 2. For example, the threshold $T_{9600}$ for estimate R(1) is given in Table 2 as 0.16 for the hypothesis test pair $H_{9600}{}^k$ and $H_{4800}{}^k$.

First, at step 502, the estimate R(1) is compared with the threshold $T_{9600}$ (e.g. $T_{9600}$=0.16). If the estimate is less than $T_{9600}$, at step 503 the rate 9600 is detected and the method returns to step 501 for the next frame. If the estimate is greater than $T_{9600}$, the method moves to step 504 to test for the data rate 4800.

At step 504, the estimate R(2) is compared with the threshold $T_{4800}$ (e.g., $T_{4800}=0.17$). If the estimate is less than $T_{4800}$, at step 505 the rate 4800 is detected and the method returns to step 501 for the next frame. If the estimate is greater than $T_{4800}$, the method moves to step 506 to test for the data rate 2400.

At step 506, the estimate R(4) is compared with the threshold $T_{2400}$ (e.g., $T_{2400}=0.17$). If the estimate is less than $T_{2400}$, at step 507 the rate 2400 is detected and the method returns to step 501 for the next frame. If the estimate is greater than $T_{2400}$, the method moves to step 508.

If the test of step 506 determines that the rate is not 2400, the default lower rate of 1200 may be determined at step 508, and then the method returns to step 501 for the next frame.

The estimated auto-correlation coefficients (R(1), R(2) and R(4)) for respective shifts may be compared with the predetermined values as shown in steps 502, 504 and 506 with the threshold detectors 104, 105 and 106, respectively. The "yes" or "no" of these steps is provided as a single bit value, with the decision logic 108 determining the rate as a two-bit value from the three one-bit values.

For implementation of the system of FIG. 1 in hardware, the calculation of auto-correlation values and estimates with correlator 102, then comparing the estimates with comparators 104–106 and using decision logic 108 may be a preferred embodiment. This embodiment may be preferred, especially when estimates are calculated with the sign-bit values, since the hardware realization employs simple circuitry, reducing power consumption and integrated circuit real estate, and may operate with relatively high speed. Another advantage of this technique is that calculation of estimates may be improved by accounting for varying measured signal-to-noise ratios, but may also require modification of hypothesis test point threshold values Other implementations may be more computationally efficient. For example, for the method of FIG. 5 in which all processing is within an application specific processor, an alternative embodiment may only calculate each of estimated auto-correlation coefficients (R(1), R(2) and R(4)) prior to comparison with the hypothesis test point threshold.

Auto-correlation computation may have the following advantages better for rate-detection. It replaces more computationally intensive methods, because auto-correlation computations comprise mostly multiplications and additions, which programmable processors may do extremely efficiently. Previous methods for rate detection included Viterbi detection and computing probability of occurrence of similar symbols. The Viterbi detection method, in particular, is orders of magnitude more computationally intensive than the auto-correlation technique of the present invention.

While the exemplary embodiments of the present invention have been described with respect to processes of circuits, the present invention is not so limited. As would be apparent to one skilled in the art, various functions of circuit elements may also be implemented in the digital domain as processing steps in a software program. Such software may be employed in, for example, a digital signal processor, micro-controller or general-purpose computer.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus for determining a data rate of a received sequence of symbols, the apparatus comprising:

a correlator adapted to calculate a set of auto-correlation values for the received sequence, each auto-correlation value corresponding to a different cyclic shift value of the received sequence;

at least one comparator adapted to generate one or more comparison values by comparing each auto-correlation value with at least one threshold value, each threshold value corresponding to a different data rate; and a decision-logic circuit adapted to determine the data rate of the sequence from the one or more comparison values.

2. The invention as recited in claim 1, wherein the correlator comprises:

a first register adapted to store the received sequence;

a second register adapted to store a cyclically shifted sequence based on a current cyclic-shift value;

a symbol multiplier adapted to multiply each symbol of the received sequence with a corresponding symbol of the cyclically-shifted sequence to generate a correlation value; and an accumulator adapted to combine each correlation value to generate the auto-correlation value for the current cyclic-shift value.

3. The invention as recited in claim 2, wherein each symbol has a corresponding period and each cyclic-shift value corresponds to an integer number of symbol periods.

4. The invention as recited in claim 2, wherein each symbol includes a sign-bit value and a magnitude value.

5. The invention as recited in claim 2, wherein each symbol is a single sign-bit value.

6. A method of determining a data rate of a received sequence of symbols, the method comprising the steps of:

a) calculating a set of auto-correlation values for the received sequence, each auto-correlation value corresponding to a different cyclic shift of the received sequence;

b) generating at least one comparison value by comparing each auto-correlation value with at least one threshold value, each threshold value corresponding to a different data rate; and c) determining the data rate of the sequence from the one or more comparison values.

7. The method as recited in claim 6, wherein, for each different cyclic-shift value, step a) includes the steps of:

a1) storing the received sequence and a cyclically shifted sequence based on a current cyclic-shift value;

a2) multiplying each symbol of the received sequence with a corresponding symbol of the cyclically shifted sequence to generate a correlation value;

a3) combining each correlation value to form the auto-correlation value for the current cyclic-shift value.

8. The invention as recited in claim 7, wherein, for step a), each cyclic-shift value corresponds to an integer number of periods of a symbol.

9. The method as recited in claim 7, wherein, for step a), each symbol includes a sign-bit value and magnitude value.

10. The method as recited in claim 7, wherein, for step a), each symbol is a single sign-bit value.

11. An receiver for decoding a received sequence of N symbols, N being an integer greater than 0, the receiver including a circuit for determining a data rate of the received sequence, the circuit comprising:

a correlator adapted to calculate a set of auto-correlation values based on the symbol values of the received sequence, each auto-correlation value corresponding to a different cyclic shift of the received sequence;

at least one comparator adapted to generate one or more comparison values by comparing each of the auto-correlation values with at least one threshold value, each threshold value corresponding to a different data rate; and a decision-logic circuit adapted to determine the data rate of the sequence from the one or more comparison values.

12. The invention as recited in claim 11, further comprising a Viterbi decoder for decoding the received sequence, the decision-logic circuit further provides a signal to the Viterbi decoder indicating the determined data rate, and the Viterbi decoder decodes the sequence of N symbols in accordance with the signal provided by the decision-logic circuit.

13. The invention as recited in claim 12, wherein each symbol value includes a sign-bit value and a magnitude value.

14. The invention as recited in claim 12, wherein each symbol value is a single sign-bit value.

15. The invention as recited in claim 11, wherein the receiver operates in accordance with an IS-95 standard.

16. The invention as recited in claim 11, wherein the receiver is included in a transceiver operating in accordance with the IS-95 standard.

17. The invention as recited in claim 11, wherein the receiver is implemented as part of an integrated circuit.

* * * * *